(12) United States Patent
Datz et al.

(10) Patent No.: US 7,682,725 B2
(45) Date of Patent: Mar. 23, 2010

(54) GAS DIFFUSION ELECTRODE AND METHOD FOR ITS PRODUCTION

(75) Inventors: Armin Datz, Poxdorf (DE); Barbara Schricker, Erlangen (DE); Manfred Waidhas, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 1512 days.

(21) Appl. No.: 10/909,219

(22) Filed: Jul. 30, 2004

(65) Prior Publication Data

US 2005/0118493 A1  Jun. 2, 2005

Related U.S. Application Data

(63) Continuation-in-part of application No. 09/793,411, filed on Feb. 26, 2001, now abandoned, which is a continuation of application No. PCT/DE99/02622, filed on Aug. 20, 1999.

(30) Foreign Application Priority Data

Aug. 26, 1998 (DE) ................................ 198 38 786

(51) Int. Cl.
  *H01M 4/00* (2006.01)
(52) U.S. Cl. ............................ 429/42; 429/40; 427/115
(58) Field of Classification Search ................... 429/42, 429/40; 29/623.5; 427/115
  See application file for complete search history.

(56) References Cited

U.S. PATENT DOCUMENTS

| 3,660,165 | A | | 5/1972 | Palmer |
| 4,166,143 | A | * | 8/1979 | Petrow et al. ................ 427/115 |
| 4,804,592 | A | * | 2/1989 | Vanderborgh et al. ......... 429/33 |
| 5,211,984 | A | | 5/1993 | Wilson |
| 7,282,293 | B2 | * | 10/2007 | Ren et al. ..................... 429/39 |
| 7,419,740 | B2 | * | 9/2008 | Binder et al. ................. 429/40 |

* cited by examiner

*Primary Examiner*—Patrick Ryan
*Assistant Examiner*—Julian Mercado
(74) *Attorney, Agent, or Firm*—Laurence A. Greenberg; Werner H. Stemer; Ralph E. Locher

(57) ABSTRACT

A gas diffusion electrode for a PEM fuel cell includes a metallic catalyst, and an electrocatalyst layer having a polymer A for hydrophobicizing the electrocatalyst layer and a uniform thickness of between 3 to 40 μm, especially 25 μm. The polymer A content is less than 10% by weight based on the metallic catalyst content. Methods of producing and of hydrophobicizing the electrode include screen printing a paste onto a carrier and removing the screen-printing medium by heating. The paste includes at least one metallic catalyst with a content of polymer A up to at most 10% by weight, and a screen-printing medium. The electrocatalyst layer of the electrode has a significantly lower content of the catalyst inhibitor TEFLON® because it is not added only to the screen-printing paste but is subsequently applied, with the same surface-specific effect, by dipping the finished electrocatalyst layer in a solution containing TEFLON®.

25 Claims, No Drawings

GAS DIFFUSION ELECTRODE AND METHOD FOR ITS PRODUCTION

CROSS-REFERENCE TO RELATED APPLICATION

This application is a Continuation-In-Part of copending application Ser. No. 09/793,411, filed Feb. 26, 2001, which is a continuation, under 35 U.S.C. § 120, of International Application No. PCT/DE99/02622, filed Aug. 20, 1999, which designated the United States; the application also claims the benefit, under 35 U.S.C. § 119, of German Patent Application 198 38 786.5, filed Aug. 26, 1998; all of the prior applications are hereby incorporated by reference herein in their entirety.

BACKGROUND OF THE INVENTION

Field of the Invention

The invention relates to a gas diffusion electrode for use in PEM fuel cells and to a method for its production. The production method is intended, in particular, to make possible hydrophobicization of the gas diffusion electrode, which is important especially in PEM fuel cells.

The core of a PEM fuel cell is a membrane electrode unit that is built up from a membrane with an electrode that is coated on both sides and includes an electrocatalyst layer. The electrode normally has a solid, gas-permeable and electrically conductive carrier (e.g., carbon fabric or carbon paper), which is preferably hydrophobicized with a polymer suspension (in the following text, the polymer will be called polymer A, which here concerns polymers such as PTFE, i.e., polytetrafluoroethylene, for example TEFLON®). Applied to the carrier is an electrocatalyst layer that, in turn, is again hydrophobicized. Therefore, the polymer A can be contained both in the carrier and in the electrocatalyst layer. In addition, the electrode can contain a further polymer as binder, which, in the present connection, is designated polymer B.

Previously, the necessary content of polymer A for hydrophobicizing the electrocatalyst layer has generally been 20-60% by weight. A higher content of polymer A, such as TEFLON®, inhibits the activity of or poisons the platinum catalyst, increases the content resistance, and reduces the porosity of the electrode. (See Watanabe, J. Elektroanal. Chem. 195 (1985) 81-83). In other words, it has a detrimental effect on the system. Therefore, the polymer A for hydrophobicizing the electrocatalyst layer can also be referred to as a "catalyst inhibitor".

In the prior art electrode, in addition to having a high content of polymer A for hydrophobicizing the electrocatalyst layer (20-60% by weight and always based on the content of metallic catalyst), the homogeneity of the thickness of the electrocatalyst layer also presents a problem. There is a requirement to provide a suitable production method that cost-effectively permits a uniform coating of the carrier with dry catalyst powder in low layer thicknesses of 3-40 µm, and further permits the coating to be mass produced.

According to conventional methods (Watanabe, J. Electroanal. Chem. 195 (1985) 81-83; J. Elektroanal. Chem. 197 (1986) 195-208 M. Uchida, J. Elektrochem. Soc., 142 (1995) 463-468), a dry powdered mixture of catalyst powder previously hyrophobicized with PTFE is pressed onto the likewise hydrophobicized carrier. To produce the mixture, the carbon powder is first mixed intensively with PTFE dispersion and then dried at a temperature above 280° C. In the process, the surface-active wetting agent (Triton X 100) contained in the dispersion is removed. The wetting agent is used to compensate for the poor processing properties that arise from the high content of polymer A in the screen-printing paste. The mixture is then pulverized. The method is very complicated, and a uniform thickness of the electrocatalyst layer in low layer thicknesses may be produced technically only with great difficulty and in low numbers. In addition, disadvantages with the method include:

- a high content of polymer A for hydrophobicizing the electrocatalyst layer is contained; and
- for the purpose of processing, a wetting agent must be added, which has to be removed specifically and leaves behind interfering residues.

The prior art discloses gas diffusion electrodes for use in electrochemical cells. See, for example, U.S. Pat. No. 4,568,442 to Goldsmith, and U.S. Pat. No. 4,615,954 to Solomon et al. In such a case, the surface of a gas diffusion electrode is to be hydrophobic, with a polymer proportion of 30% being viewed as suitable. See, in particular, the example in U.S. Pat. No. 4,615,954 to Solomon et al.

According to U.S. Pat. No. 4,229,490 to Frank et al., and European Patent Application 0 357 077 A1, the production of such gas diffusion electrodes is carried out by a screen-printing technique. Screen printing is a conventional technique for producing a uniformly thin layer. The use of screen printing to build up an electrochemical system is already known. According to U.S. Pat. No. 4,229,290 to Frank et al., for such a purpose, the screen-printing paste, which contains TEFLON® dispersion, graphite, and platinum black, must, in turn, have added to it more than 50% by weight of the wetting or dispersing agent "Triton X 100" for the purpose of stabilization. The proportion of TEFLON® used for hydrophobicization in the screen-printing paste, and, therefore, that which is present in the resulting electrocatalyst layer is about 25% by weight. The paste is printed onto a solid carrier, for example, carbon paper, which again contains 60% by weight of TEFLON®. The result is a total content of TEFLON® of about 85%. The drawback with the electrode produced by such a method, in addition to the extremely high content of polymer A for hydrophobicizing the electrocatalyst layer (here: TEFLON®), is also the wetting agent added to more than 50% by weight (of the catalyst paste).

SUMMARY OF THE INVENTION

It is accordingly an object of the invention to provide a gas diffusion electrode and a method for its production that overcomes the hereinafore-mentioned disadvantages of the heretofore-known devices and methods of this general type and that is cost-effective and capable of mass production, and that achieves the hydrophobicization of the gas diffusion electrode with a low proportion of polymer A.

With the foregoing and other objects in view, there is provided, in accordance with the invention, a gas diffusion electrode for a PEM fuel cell including a metallic catalyst, and an electrocatalyst layer having a polymer A for hydrophobicizing the electrocatalyst layer, a content of the polymer A being less than 10% by weight based on a content of the metallic catalyst, and a uniform thickness of between 3 to 40 µm.

With the objects of the invention in view, there is also provided a method of producing a gas diffusion electrode for a PEM fuel cell, including the steps of screen printing a screen-printing paste onto a carrier, the screen-printing paste including at least one metallic catalyst with a content of polymer A up to at most 10% by weight, and a screen-printing medium, and removing the screen-printing medium by heating.

The subject of the invention is a gas diffusion electrode for a PEM fuel cell having an electrocatalyst layer having a content of hydrophobicizing polymer A of less than 10% by weight and a uniform thickness of the electrocatalyst layer of less than or equal to 20 µm. Also, the invention relates to a gas diffusion electrode that is produced by a screen-printing process with a screen-printing paste that includes a polymer A content for hydrophobicizing the electrocatalyst layer of at most 10% (based on the content of metallic catalyst), at least one metallic catalyst, and a high-boiling solvent. The invention further relates to a method for producing a gas diffusion electrode in which, in the screen-printing process, a catalyst paste that includes at least one metallic catalyst and a screen-printing medium is printed onto an electrode and/or a membrane, and the screen-printing medium is removed by heating in a following, second operation. The invention relates to a method for hydrophobicizing a gas diffusion electrode in which a ready-coated electrode is dipped into a solution of the polymer A for hydrophobicization. The invention also relates to using a gas diffusion electrode according to the invention in a fuel cell.

In accordance with another feature of the invention, the electrocatalyst conveyor and/or the screen-printing paste (based on their content of metallic catalyst) contain only 0.01 to 1% by weight, preferably, 0.05 to 0.5% by weight, particularly, 0.075 to 0.2% by weight, and, in particular, 0.1% by weight of polymer A for hydrophobicizing the electrocatalyst layer.

In accordance with an added feature of the invention, the polymer A for hydrophobicizing the electrocatalyst layer is TEFLON®, in particular, an amorphous modification of TEFLON® that can be brought into solution.

In accordance with an additional feature of the invention, the metallic catalyst used is platinum black or platinum on carbon.

In accordance with yet another feature of the invention, the high-boiling solvent used in the screen-printing and/or catalyst paste is an ester and/or a ketone and/or an alcohol, in particular, glycolic acid butyl ester, cyclohexanone, and/or terpineol.

According to one refinement of the invention, the catalyst paste, apart from the metallic catalyst and the high-boiling solvent, also has added to it as binder a polymer B, preferably, a polymer that can be baked out to 400° C.

In accordance with a further feature of the invention, the content of the polymer A in the electrocatalyst layer for hydrophobicizing the electrocatalyst layer approaches zero, with zero being ruled out. In this case, the electrode is dipped in a solution of fluid polymer A and the content of polymer A (amorphous Teflon) is mainly on the surface.

In accordance with the latter mode of the invention, for example, the polymer A can be omitted completely from the screen-printing paste, the hydrophobicization of the finished electrocatalyst layer is carried out after the screen-printing coating by dipping the complete electrode into a solution of the hydrophobicizing polymer A. The solution contains the polymer A preferably at 0.01 to 1% by weight, particularly preferably, 0.05 to 0.5% by weight, and, quite particularly, preferably 0.075 to 0.2% by weight, in particular, 0.1% by weight. Preferably, the solvent is a perfluorinated solvent like a completely fluorinated organic compound that, for example, can be produced by the electrochemical fluorination of alkanes.

In accordance with yet an added mode of the invention, it is advantageous if, following the hydrophobicization, the electrode is dried in a further operation, preferably at temperatures between 20° C. and 120° C.

In accordance with yet an additional feature of the invention, in order to fill up the large pores and, therefore, to reduce the quantity of catalyst needed for complete coating, a carbon paste including electrically conductive carbon black and screen-printing medium is first printed onto the carrier. The printing produces the very first screen-printed coating of the carrier with carbon. Only following the drying of the first screen-printed coating is the screen printing with the—considerably more expensive—catalyst paste carried out.

In accordance with again another mode of the invention, the carrier is precoated with a carbon paste of electrically conductive carbon black prior to the screen-printing step.

In accordance with again a further mode of the invention, in order to achieve a different content of polymer A in the gas diffusion electrode, both the carbon paste of the first screen-printing operation and the carrier, or both, can additionally contain polymer A.

The total content of polymer A in the gas diffusion electrode is conceptually separated from the critical content of "polymer A for hydrophobicizing the electrocatalyst layer" because the designation listed is understood to mean only the quantity of polymer A that is applied to the electrocatalyst layer by the dip bath and/or through the screen-printing paste. The total content of polymer A in the gas diffusion electrode (that is to say, the content of polymer A in the carrier, in the first screen-printed layer, and in the electrocatalyst layer together) advantageously adds up to up to 20% by weight, preferably, to less than 15% by weight, particularly preferably, to less than 10% by weight, quite particularly preferably, to less than 5% by weight and, in particular, to less than 3.5% by weight.

The polymer A preferably used is TEFLON®, in particular, a modification that is present in amorphous and/or transparent form and may be dissolved completely in fluorinated solvents. Alternatively, however, a different polymer, such as ethylene propylene copolymer or a different fluorine-containing polymer, e.g., polyvinylidene fluoride (PVDF) can also be used.

The electrocatalyst layer referred to here is the layer that is preferably applied to a solid, gas-permeable and electrically conductive carrier of the electrode, and on whose catalytic surface the anodic oxidation of the fuel to protons or the cathodic reduction of the oxygen takes place. The electrocatalyst layer includes at least the metallic catalyst, which preferably contains platinum and can be used in pure form as platinum black or in diluted form as platinum on carbon in the catalyst paste. The electrocatalyst layer preferably contains no further constituents because, according to the preferred embodiment of the invention, the screen-printing medium that is added to the catalyst paste for processing has been removed by drying and heating the finished, that is to say, coated, electrode.

The "uniform electrocatalyst layer thickness" referred to here is a layer 3-40 µm thick, which has been applied by a conventional screen-printing process and whose thickness fluctuation is generally below that which can be achieved with a different coating technique for fuel-cell electrodes. The layer is especially provided with a thickness of 25 µm, which has been found to be particularly advantageous in the field of fuel cells for submarines.

For processing, the screen-printing paste (also called carbon or catalyst paste, depending on the operation) has added to it at least a high-boiling solvent as a screen-printing medium, such as an ester, ketone, and/or an alcohol, in particular, glycolic acid butyl ester, cyclohexanone, and/or terpineol. It is advantageous if, as a screen-printing medium, it is not only a high-boiling solvent that is added but also, as a binder, a polymer B, such as polyvinyl alcohol and/or polyethylene oxide. Preferably, the polymer B can be baked out, in particular, at temperatures up to 400° C., or leaves behind only residues that do not interfere with the operation of the fuel cell.

The electrode is a gas-permeable, electrically conductive layer on the membrane, which preferably includes a carrier with an electrocatalyst layer. The carrier or substrate used is, preferably, a carbon fabric or a carbon paper or another porous and electrically conductive substrate.

Other features and modes that are considered as characteristic for the invention are set forth in the appended claims.

Although the invention described herein as embodied in a gas diffusion electrode and a method for its production, it is nevertheless not intended to be limited to the details given because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying examples.

DESCRIPTION OF THE PREFERRED EMBODIMENT

In the following text, the method according to the invention will be explained in more detail using a preferred embodiment.

In order to produce the screen-printing pastes, the carbon or catalyst powder is added to a screen-printing medium, made of polyethylene oxide dissolved in terpineol, for example, while stirring. The content of binder is 0 to 20% by weight, preferably, 5 to 15% by weight. The catalyst used is platinum black or platinum on carbon. Screen printing is carried out with a commercially available screen-printing machine. Stainless-steel screens with a size of up to 760*700 mm$^2$ are used, with a mesh width of 100 to 300 meshes per inch (about 39 to 118 meshes per cm). Using the latter, wet layer thicknesses from 6 to 60 μm per printing operation can be achieved. Virtually any desired areas are coated per printing operation, limited by the size of the printable area of the screen-printing machine. Following the printing operation, the electrodes are dried at 120° C. and baked out at 360° C. in order to remove the binder.

The platinum covering, determined by weighing is 2-3 mg/cm$^2$ if pure platinum black is used as the catalyst and 0.15 to 0.4 mg/cm$^2$ if platinum on carbon is used as the catalyst, depending on the platinum covering of the carbon.

For hydrophobicization, the ready-coated gas diffusion electrode is dipped into a solution of a polymer A for hydrophobicizing the electrocatalyst layer and is then dried. Any desired gas diffusion electrode can be hydrophobicized retrospectively in this way.

Current/voltage curves of membrane/electrode units with gas diffusion electrodes according to the invention were recorded, in which an extremely low voltage drop at high current intensities could be observed. The drop can be attributed, inter alia, to the low diffusion inhibition, caused by the low content of polymer A and damage to the hydrophobicization by residues of wetting agent within the porous electrocatalyst layer.

The present screen printing method makes it possible to reduce the costs for electrode production considerably. Using the screen-printing process, a uniform layer thickness is achieved over the entire electrode, even in the case of large electrodes (e.g., 36*36 cm$^2$), as well as good reproducibility during mass production. Because the hydrophobicization is carried out only at the conclusion of the method, if at all, by dipping the complete electrode into a solution of the polymer A, the processing properties (and the bake-out behavior) of the screen-printing pastes are not impaired by the polymer suspension and additional wetting and dispersion agents, which tend to coagulate and/or foam.

According to the invention, in order to hydrophobicize the electrode, considerably lower quantities of polymer A are needed in the electrocatalyst layer because the polymer A is deposited from the solution only as a thin film on the surface of the electrode particles (carbon, platinum etc.). The electrocatalyst layer advantageously contains only 0.01 to 0.5% by weight, preferably, 0.05 to 0.3% by weight, particularly preferably, 0.075 to 0.2% by weight, and, in particular, 0.1% by weight of polymer A for hydrophobicizing the electrocatalyst layer, instead of 20 to 60% by weight as hitherto. As a result, blockage of the gas pores by polymer A agglomerates in the electrocatalyst layer and/or in the carrier are prevented to the maximum extent.

The invention replaces the previous hydrophobicization technique in gas diffusion electrodes of fuel cells. Instead of the conventional incorporation of the polymer A (which is a catalyst inhibitor) for hydrophobicizing the electrocatalyst layer in the electrocatalyst paste, the ready-coated electrode is dipped into a hydrophobicization bath. The particular advantage of such a gas diffusion electrode is, in addition to having a low polymer A content, also an improved homogeneity of the layer thickness because the electrocatalyst paste can be processed better in the screen-printing process without the addition of polymer A.

We claim:

1. A gas diffusion electrode for a PEM fuel cell, comprising:
    an electrocatalyst layer having:
        a metallic catalyst selected from the group consisting of platinum black and platinum-on-carbon and having a given platinum content;
        a polymer A selected from the group consisting of PTFE, ethylene propylene copolymer, and PVDF for hydrophobicizing said electrocatalyst layer, a content of said polymer A being less than 10% by weight based on the given platinum content of said metallic catalyst; and
        a uniform thickness of between 3 to 40 μm.

2. The gas diffusion electrode according to claim 1, wherein said uniform thickness of said electrocatalyst layer is approximately 25 μm.

3. The gas diffusion electrode according to claim 1, wherein said electrocatalyst layer has a uniform thickness of between 3 and 20 μm.

4. The gas diffusion electrode according to claim 1, wherein said content of said polymer A is between 0.01 and 1% by weight.

5. The gas diffusion electrode according to claim 1, wherein said content of said polymer A approaches zero based on the content of said metallic catalyst, said electrocatalyst has a surface, and said polymer A is disposed on said surface of said electrocatalyst layer.

6. The gas diffusion electrode according to claim 1, wherein said content of said polymer A approaches zero based on the content of said metallic catalyst, and including a substrate, said polymer A being disposed on said substrate.

7. The gas diffusion electrode according to claim 1, wherein said content of said polymer A approaches zero based on the content of said metallic catalyst and said electrocatalyst has a surface, and including a substrate, said polymer A being disposed on at least one of said substrate and said surface of said electrocatalyst layer.

8. The gas diffusion electrode according to claim 1, wherein said metallic catalyst includes one of platinum black and platinum on carbon, and a polymer B as binder.

9. The gas diffusion electrode according to claim 1, wherein said electrocatalyst layer has a uniform thickness of between 3 and 20 µm.

10. The gas diffusion electrode according to claim 1, wherein said content of said polymer A is between 0.01 and 1% by weight.

11. A method of producing the gas diffusion electrode for a PEM fuel cell according to claim 1, which comprises:
    screen printing a screen-printing paste onto a carrier, the screen-printing paste including:
    at least one metallic catalyst with a content of polymer A selected from the group consisting of PTFE, ethylene propylene copolymer, and PVDF up to at most 10% by weight; and
    a screen-printing medium; and
    removing the screen-printing medium by heating.

12. The method according to claim 11, wherein the screen printing step is performed by screen printing the screen-printing paste having a uniform thickness of between 3 to 40 µm.

13. The method according to claim 11, wherein the screen printing step is performed by screen printing the screen-printing paste having a uniform thickness of approximately 25 µm.

14. The method according to claim 11, wherein the screen printing step is performed by screen printing the screen-printing paste having a uniform thickness of between 3 and 20 µm.

15. The method according to claim 11, wherein the content of the polymer A is between 0.01 and 1% by weight.

16. The method according to claim 11, wherein the content of the polymer A approaches zero based on the content of the metallic catalyst and the polymer A is disposed on at least one of the carrier and a surface of the screen-printing paste.

17. The method according to claim 11, wherein the screen-printing medium is a high-boiling solvent.

18. The method according to claim 11, wherein the removing step is performed by removing the screen-printing medium by heating to at most 400° C.

19. The method according to claim 11, which further comprises precoating the carrier with a carbon paste of electrically conductive carbon black prior to the screen-printing step.

20. The method according to claim 11, wherein the carrier is a substrate containing polymer A.

21. A method of producing the gas diffusion electrode for a PEM fuel cell according to claim 1, which comprises:
    screen printing a screen-printing paste onto a carrier, the screen-printing paste including:
    at least one metallic catalyst with a proportion of polymer A approaching zero; and
    a screen-printing medium;
    removing the screen-printing medium by heating; and
    hydrophobicizing the electrode by dipping the electrode ready-coated in the screen-printing process into a polymer A selected from the group consisting of PTFE, ethylene propylene copolymer, and PVDF solution.

22. The method according to claim 21, which further comprises drying the electrode after hydrophobicization.

23. In a fuel cell, a gas diffusion electrode, comprising:
    an electrocatalyst layer having:
        a metallic catalyst selected from the group consisting of platinum black and platinum-on-carbon and having a given platinum content;
        a polymer A selected from the group consisting of PTFE, ethylene propylene copolymer, and PVDF for hydrophobicizing said electrocatalyst layer, a content of said polymer A being less than 10% by weight based on the given platinum content of said metallic catalyst; and
        a uniform thickness of between 3 to 40 µm.

24. A gas diffusion electrode for a PEM fuel cell produced in accordance with the method of claim 11, the gas diffusion electrode comprising:
    an electrocatalyst layer having:
        a metallic catalyst selected from the group consisting of platinum black and platinum-on-carbon and having a given platinum content;
        a polymer A selected from the group consisting of PTFE, ethylene propylene copolymer, and PVDF for hydrophobicizing said electrocatalyst layer, a content of said polymer A being less than 10% by weight based on the given platinum content of said metallic catalyst; and
        a uniform thickness of between 3 to 40 µm, especially 25 µm.

25. The gas diffusion electrode according to claim 24, wherein the screen-printing paste has a uniform thickness of approximately 25 µm.

* * * * *